UNITED STATES PATENT OFFICE 2,489,473

TREATED TEXTILE AND PROCESS OF MAKING

Ernst Zerner and Peter I. Pollak, New York County, N. Y., assignors to Sun Chemical Corporation, New York, N. Y., a corporation of Delaware No Drawing. Continuation of application Serial No. 556,276, September 28, 1944, which is a division of application Serial No. 520,824, February 2, 1944. Divided and this application November 15, 1946, Serial No. 710,218

14 Claims. (Cl. 117—139.5)

This is a continuation of our application Serial No. 556,276, filed September 28, 1944, now abandoned, which was divided from our application Serial No. 520,824, filed February 2, 1944, and now abandoned.

Our invention relates to the treatment of textile materials. We have discovered certain new water soluble chemical products which are very useful for treating textile fibres in aqueous media.

One object of this invention is to prepare novel products which impart soft feel and water repellency to textile cloths and textile fibres. Furthermore, the so obtained water repellency is absolutely fast to dry cleaning and laundering.

We have found that by using certain novel intermediary compositions, quaternary ammonium products having the properties mentioned above can be produced. Said intermediary novel compounds will be obtained according to our invention by subjecting amides of fatty acids containing from 12 to 30 carbon atoms to prolonged heating to high temperatures. It is our belief that the resulting products to be used as intermediaries in the production of quaternary ammonium compounds are di-acyl-imides

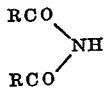

wherein RCO stands for acyl radicals from 12 to 30 carbon atoms.

Although we assume with great probability that this constitution is correct—an assumption based on our analytical work—we nevertheless do not wish to limit ourselves in any way by theoretical considerations.

In order to produce the intermediaries in accordance with this invention, stearamide, for instance, is heated first to a high temperature (300–350° C.) whereby a far going decomposition occurs, a reaction occurring whereby the amide is split quantitatively into the corresponding acid and nitrile under evolution of ammonia. This reaction takes place according to the following equation:

$$2C_{17}H_{35}CONH_2 \rightarrow C_{17}H_{35}CN + C_{17}H_{35}COOH + NH_3$$

This reaction is indeed observed; a fact which can be substantiated by measuring the amount of ammonia evolved and by checking the acid number of the reaction mixture.

However, if this heating is continued long enough and a sufficiently high temperature maintained, the reaction products from the above mentioned reaction react further, which may also be followed by checking the acid number intermittently of the reaction mixture.

If the heating is continued long enough the acid number increases initially, reaches a maximum and declines subsequently to almost zero.

According to our understanding, the acid and the nitrile of the fatty acid in question undergo a molecular rearrangement which finally produces the hitherto unknown di-stear-imide $$(C_{17}H_{35}CO)_2NH$$

In the case of fatty acids of lower molecular weight this reaction has been observed and studied (Richter, Organic Chemistry, 3d ed. vol 1, p. 322). The formation of ketones or hydrocarbons from the initially formed stearic acid takes place to a very small degree only, if it takes place at all, since carbon dioxide was obtained in very small quantities even on heating mixtures for forty hours.

The product which is obtained by prolonged heating of stearamide to high temperatures (300–350° C.) and which shows the relatively low acid number of only five to fifteen, is of deep brown, dark color and almost liquid at room temperature. This crude mixture is distilled under reduced pressure whereby about 80 per cent distill within the range of 150–200° C. at 5 mm. as a colorless oil. The bulk of the distillate boils between 180–190° C. at 5 mm. This distillate probably consists to a very great extent of the hitherto unknown di-stear-imide, $(C_{17}H_{35}CO)_2NH$, since it has a nitrogen content of 2.5 per cent while calculations for the imide indicate 2.55 per cent, and a molecular weight (Rast) found 488, calculated 549.

The product is subsequently chloromethylated in well known fashion and the so obtained compound is reacted, for instance, with pyridine to form a product containing the quaternary pyridinium chloride compound having the probable formula:

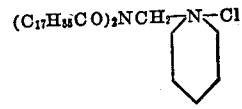

Instead of the above mentioned stearamide, amides of fatty acids may be used containing from 12–30 carbon atoms, such as lauramide, myristic acid amide, palmitic acid amide, montanic acid amide, etc.; in general, amides of fatty acids as obtained from naturally occurring fats. In the case of amides of unsaturated fatty acids the sequence of reactions should be undertaken with the exclusion of air, which may be accomplished by bubbling through some inert gas such as nitrogen, since otherwise extensive resinification will take place. As starting material may further be used amides of acids which are obtained by catalytic oxidation of hydrocarbons, as, for instance, paraffin.

Other tertiary bases such as the picolines, quinolines, etc. may be used in place of pyridine.

Instead of using pure amides, like stearamide, as starting material, mixtures of amides, like stearamide and palmitic acid amide, may just as well be used, or others, such as are generally found in commercial fatty acid amides.

Also, we heated an equivalent mixture of stearic acid and stearonitrile to 300–350° C. for a longer period. In this case we also observed a marked decrease in the acid number of the mixture to almost zero. The obtained reaction product resembles the one obtained from stearamide and distills under identical conditions under reduced pressure. The following chloromethyl compound and the corresponding pyridinium compound, too, showed the same properties as the compounds obtained from stearamide. In the course of this reaction we further noted that a small amount of stearamide added to the reaction mixture catalyzes the rearrangement.

A very similar product as the two mentioned before was obtained when an equivalent mixture of stearic acid and stearamide was heated to 300° C. We noticed in this case the splitting off of water so that here at least partially the following reaction takes place:

$$C_{17}H_{35}CONH_2 + C_{17}H_{35}COOH \rightarrow$$
$$(C_{17}H_{35}CO)_2NH + H_2O$$

which also leads to the formation of the di-stearimide. This reaction may be accelerated by adding zinc chloride or other agents which further the removal of water as catalysts.

Without limiting our invention to any special procedure, the following examples are given to illustrate our preferred methods of operating: (Parts by weight.)

EXAMPLE I 566 parts of commercial stearamide containing about 5 per cent free fatty acid are heated to 320° C. for 17 hours in a nitrogen atmosphere. The reaction is performed in a three-neck flask fitted with a gas inlet tube, thermometer, a short outlet tube bent at an angle. This outlet tube is connected with a large test tube with side-arm which in turn is connected to a separatory funnel. The connection and delivery tube reaches below the level of a known amount of sulfuric acid placed in the separatory funnel. From there the gases are led into a vessel containing a saturated solution of barium hydroxide. The nitrogen is used as a carrier gas for the ammonia and other gases evolved in the reaction mixture. The ammonia is absorbed in the sulfuric acid which is titrated in aliquot parts taken from the lower end of the separatory funnel; the evolution of carbon dioxide is checked in the barium hydroxide solution. The side-arm test tube directly attached to the reaction vessel serves as a receptacle for distillate and other impurities carried from the reaction mixture by the nitrogen stream. By determining the acid number of the mixture at certain time intervals and checking the amount of ammonia delivered, a fairly accurate picture of the course of the reaction may be obtained. The following table will illustrate this point:

Table

| Time (h) | Acid Number of Mixture | Ammonia evolved (per cent of theory) |
|---|---|---|
| 00 | 10.2 | 0 |
| 2½ | | 28.6 |
| 3½ | | 38.3 |
| 4½ | 65.7 | 54.9 |
| 6½ | | 61.3 |
| 7½ | 62.9 | 62.3 |
| 9½ | 40.0 | 65.2 |
| 13½ | 31.3 | 65.7 |
| 17½ | 15.2 | 65.6 |

The reaction is interrupted at an acid number of 15.2. No appreciable precipitate is formed in the barium hydroxide solution. The dark, almost liquid mass is distilled under reduced pressure. The distillate is a colorless half-solid melting completely at 32° C. The yield is 428 parts or 75.5 per cent of the original amount. The distillate has a nitrogen content of 2.50 per cent, calculated for the di-stear-imide, 2.55 per cent. Molecular weight found 488, calculated 549.

200 parts of this distillate are treated with 16.4 parts of paraformaldehyde in a solution of 200 parts per volume of benzene. The reaction mixture is treated with a strong stream of hydrochloric gas for several hours. The reaction is somewhat exothermic yielding a viscous mass as the end product. The mass is subjected to distillation under reduced pressure in order to free it from the solvent present and 350 parts are treated with 60 parts of pyridine under agitation whereby care has to be taken that the temperature does not exceed 60° C. The so obtained buff-colored viscous mass shows excellent water solubility, or dispersibility.

Four pounds of this material are dissolved in 12 gallons of one per cent sodium acetate solution at room temperature. A piece of poplin is dipped into the solution, squeezed out and dipping and squeezing repeated. The cloth is then dried in the open air and cured for three to four minutes at 150° C. Thereafter it is washed with a one-half per cent soap solution at 50° C., thoroughly rinsed and ironed. The so treated fabric has a very soft and nice feel, and shows excellent water repellency. Original spray rating 100. After three dry cleanings the spray rating is practically unaffected. After three launderings the spray rating decreases to 90.

EXAMPLE II 284 parts of stearic acid are melted together with 265 parts commercial stearonitrile and subsequently heated to temperatures of about 325° C. During a period of 24 hours the acid number of the mixture decreased to 70.9 from the original value of 101.2. After adding 5.5 g. of stearamide (one per cent by weight) the acid number drops to 22.5 within 12 hours, or a total of 36 hours reaction time. Upon distillation under reduced pressure 393 g. (71.5 per cent) of a colorless distillate are obtained from the dark brown, almost liquid crude material. This distillate solidifies on standing and melts at 34° C.; it has an acid number of 12.3 and shows a nitrogen content of 2.6 per cent.

The subsequent treatment for formation of the pyridinium compound is substantially the same as Example I.

Five and one-half pounds of this pyridinium compound are dissolved in 12 gallons of water containing 1.2 pounds sodium acetate at 40° C. Plain weave gray cotton cloth is dipped into the solution for a few seconds, and the excess of liquid squeezed out. The pickup is about 75 per cent. The fabric is subsequently ironed with a flat iron heated to about 180° C. for one to two minutes. Feel and performance of the fabric is similar to that of Example I.

EXAMPLE III

The analogous reaction as constituted in Example I is carried out with commercial lauric acid amide instead of stearic acid amide. The amide is heated to 270° C. for about half an hour, whereafter the original acid number of 12.8 increases to 113.3 and the evolution of ammonia ceases. Subsequently the reaction vessel is closed and the reaction temperature raised to 310° C. The heating is continued for another 15 hours, whereafter the acid number is decreased to 8.4. Upon distillation of the reaction mass at reduced pressure a yield of 82 per cent of colorless liquid is obtained, boiling at 135–180° C. at 4 mm. The distillate shows a nitrogen content of 3.46 per cent, calculated for the di-laur-imide, 3.67 per cent, molecular weight found 360, calculated 381.

This product is subsequently chloromethylated and converted into the pyridinium compound as described in Example I.

A solution of six pounds of this pyridinium compound is made up in ten gallons of a 1.5 per cent sodium acetate solution. A piece of gabardine is treated with this solution as described in Example I, except that the baking is performed for ten minutes at 120° C. The so treated fabric has a very good feel and shows excellent water repellency, fast to dry cleaning and laundering.

EXAMPLE IV 284 parts of stearic acid are mixed with 283 parts of stearamide. After melting, the temperature of the mixture is raised to 330–340° C. and is kept there for a total of 36 hours. The acid number of the mixture is checked frequently and shows a maximum increase of 114.5 from 99.3, after which it falls gradually to 14.2. A dark, almost liquid material results which is subjected to vacuum distillation. At 150–200° C. at 5 mm. a clear colorless distillate is collected weighing 444 parts (81 per cent) of input. It melts at 33° C. and has a nitrogen content of 2.49 per cent, calculated for di-stear-imide, 2.55 per cent, acid number after distillation, 16.1. The product is subsequently treated as indicated in Example I to produce the pyridinium compound.

Loose wool is impregnated as indicated in Example I, with a 5 per cent solution of this pyridinium compound in water. No sodium acetate is used in this case. The curing is performed at 120° C. for eight minutes. The wool shows an enhanced water repellent effect which it does not lose by washing or dry cleaning.

As mentioned before, textiles treated with a product obtained according to our process as described in the foregoing examples, show an original spray rating of 100.

The water repellency of said fabrics remains substantially unchanged even when the fabrics are subjected to dry-cleaning or laundering processes in the usual way.

It will be understood that many variations and modifications may be made in the details of procedure above set forth without departing from the spirit of this invention.

In the term "textiles" are included cotton, jute, linen, hemp, various artificial fibres or organic material, and wool. Furthermore, it will be possible to treat successfully other materials than those mentioned above, e. g., paper, leather, wood, etc., with products according to our invention.

We claim:

1. The process of treating normally non-water repellent material to impart water repellent properties thereto which comprises impregnating said material with a product resulting from the sequential steps of heating at a temperature above approximately 300° C. and below approximately 350° C. a material selected from the class consisting of amides of fatty acids of the formula $RCONH_2$ where R is a fatty radical containing 12–30 carbon atoms, mixtures of fatty acids containing 12–30 carbon atoms and nitriles of fatty acids containing 12–30 carbon atoms, and mixtures of fatty acids containing 12–30 carbon atoms and amides of fatty acids of the formula $RCONH_2$ where R is a fatty radical containing 12–30 carbon atoms, said heating being continued until the acid number of the product of the heating is below approximately 25, thereafter chlormethylating said product of the heating, and reacting the resulting chlormethylated material with a tertiary amine; and subsequently subjecting the impregnated material to heat treatment at a temperature above approximately 100° C. and below approximately 180° C.

2. A water repellent material obtained by impregnating a normally non-water repellent material with the product resulting from the sequential steps of heating at a temperature above approximately 300° C. and below approximately 350° C., a material selected from the class consisting of amides of fatty acids of the formula $RCONH_2$ where R is a fatty radical containing 12–30 carbon atoms, mixtures of fatty acids containing 12–30 carbon atoms and nitriles of fatty acids containing 12–30 carbon atoms, and mixtures of fatty acids containing 12–30 carbon atoms and amides of fatty acids of the formula $RCONH_2$ where R is a fatty radical containing 12–30 carbon atoms, said heating being continued until the acid number of the product of the heating is below approximately 25, chlormethylating said product of the heating, thereafter reacting the resulting chlormethylated material with a tertiary amine, and subsequently subjecting the impregnated material to heat treatment above approximately 100° C. and below approximately 180° C.

3. The process of treating normally non-water repellent material to impart water repellent properties thereto which comprises impregnating said material with a product resulting from the sequential steps of heating an amide of a fatty acid of the formula $RCONH_2$ where R is a fatty radical containing 12–30 carbon atoms at a temperature above approximately 300° C. and below approximately 350° C. until the acid number of the product of the heating is below approximately 25, chlormethylating said product of the heating, and thereafter reacting the resulting chlormethylated material with a tertiary amine; and subsequently subjecting the impregnated material to heat treatment at a temperature above approximately 100° C. and below approximately 180° C.

4. A water repellent material obtained by impregnating a normally non-water repellent material with the product resulting from the sequential steps of heating an amide of a fatty acid of the formula RCONH$_2$ where R is a fatty radical containing 12-30 carbon atoms at a temperature of above approximately 300° C. and below approximately 350° C. until the acid number of the product of the heating is below approximately 25, chlormethylating said product of the heating, thereafter reacting the resulting chlormethylated material with a tertiary amine, and subsequently subjecting the impregnated material to heat treatment above approximately 100° C. and below approximately 180° C.

5. The process of treating materials to impart water repellent properties thereto which comprises impregnating said material with a mixture resulting from the sequential steps of heating a mixture containing at least one mol of a fatty acid containing 12-30 carbon atoms and at least one mol of a fatty acid nitrile containing 12-30 carbon atoms at a temperature of above approximately 300° C. and below approximately 350° C., until the acid number of said heated mixture is below 25, thereafter chlormethylating said heated mixture, and thereafter reacting chlormethylated mixture with a tertiary amine and subsequently subjecting said impregnated material to heat treatment at a temperature of above approximately 100° C. and below approximately 180° C.

6. A material having water repellent properties and comprising the product resulting from impregnating a material with the mixture resulting from sequential steps of heating a mixture of at least one mol of a fatty acid containing 12-30 carbon atoms and at least one mol of a fatty acid nitrile containing 12-30 carbon atoms at a temperature of above approximately 300° C. and below approximately 350° C. until the acid number of said heated mixture is below approximately 25 thereafter chlormethylating said heated mixture and thereafter reacting said chlormethylated mixture with a tertiary amine, and subsequently subjecting the impregnated material to heat treatment at a temperature above approximately 100° C. and below approximately 180° C.

7. The process of treating materials to impart water repellent properties thereto which comprises impregnating a material with the mixture resulting from the sequential steps of heating a mixture containing at least one mol of a fatty acid containing 12-30 carbon atoms and at least one mol of an amide of a fatty acid of the formula RCONH$_2$ where R is a fatty radical containing 12-30 carbon atoms at a temperature of above approximately 300° C. and below approximately 350° C., until the acid number of said heated mixture is below 25, thereafter chlormethylating said heated mixture, and thereafter reacting said chlormethylated mixture with a tertiary amine, and subjecting the impregnated material to heat treatment at a temperature above approximately 100° C. and below approximately 180° C.

8. A material having water repellent properties and comprising a product resulting from impregnation of a material with the mixture resulting from the sequential steps of heating the mixture containing at least one mol of a fatty acid containing 12-30 carbon atoms and at least one mol of an amide of a fatty acid of the formula RCONH$_2$ where R is a fatty radical containing 12-30 carbon atoms at a temperature above approximately 300° C. and below 350° C., until the acid number of said heated mixture is below approximately 25, thereafter chlormethylating said heated mixture, and thereafter reacting said chlormethylated mixture with a tertiary amine and subjecting said impregnated material to heated treatment above approximately 100° C. and below approximately 180° C.

9. The process of treating textile materials to impart thereto water-repellent properties which comprises impregnating the same with a compound of the general formula (R—CO)$_2$NCH$_2$Y—X wherein R—CO stands for a fatty acid radical containing from 12 to 30 carbon atoms; Y stands for the molecule of a nitrogenous tertiary base, while X stands for halogen, said compound being obtained by chloromethylating and reacting with a nitrogenous tertiary base a secondary diacylamide of the general formula (RCO)$_2$NH wherein RCO stands for a fatty acid radical containing from 12-30 carbon atoms, said secondary amid having a melting point below 40° C. and a boiling point below 220° C. at 5 mm.; and afterwards subjecting the impregnated textile material to heat treatment at a temperature over 100° C.

10. The process of treating textile material to impart thereto water repellent properties, which comprises impregnating the same with the compound of the formula

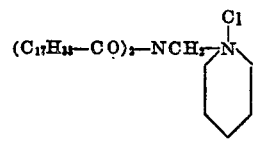

and afterwards subjecting the impregnated material to heat treatment at a temperature over 100° C.

11. The process of treating textile material to impart thereto water repellent properties, which comprises impregnating the same with the compound of the formula

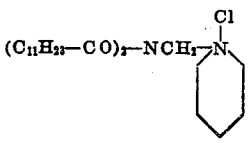

and afterwards subjecting the impregnated material to heat treatment at a temperature over 100° C.

12. Textile material having water repellent properties, said material being the product of the process defined in claim 9.

13. Textile material having water repellent properties, said material being the product of the process described in claim 10.

14. Textile material having water repellent properties, said material being the product of the process described in claim 11.

ERNST ZERNER.
PETER I. POLLAK.

REFERENCES CITED

The following references are of record in the file of this patent:

UNITED STATES PATENTS

| Number | Name | Date |
| --- | --- | --- |
| 2,125,901 | Evans | Aug. 9, 1938 |
| 2,365,813 | Glustenkamp | Dec. 22, 1944 |
| 2,388,132 | Fischer | Oct. 30, 1945 |